US012580472B2

(12) United States Patent
Rhee et al.

(10) Patent No.: US 12,580,472 B2
(45) Date of Patent: Mar. 17, 2026

(54) APPARATUS AND METHOD FOR CONTROLLING BIDIRECTIONAL RESONANT DC-DC CONVERTERS

(71) Applicant: Hyundai AutoEver Corp., Seoul (KR)

(72) Inventors: Woo Won Rhee, Seoul (KR); Dong Hui Lim, Seoul (KR)

(73) Assignee: Hyundai AutoEver Corp., Seoul (KR)

( * ) Notice: Subject to any disclaimer, the term of this patent is extended or adjusted under 35 U.S.C. 154(b) by 216 days.

(21) Appl. No.: 18/397,249

(22) Filed: Dec. 27, 2023

(65) Prior Publication Data

US 2024/0223066 A1 Jul. 4, 2024

(30) Foreign Application Priority Data

Dec. 28, 2022 (KR) .......................... 10-2022-0187163

(51) Int. Cl.
H02M 1/00 (2006.01)
H02M 3/00 (2006.01)
H02M 3/335 (2006.01)

(52) U.S. Cl.
CPC ........... H02M 1/0043 (2021.05); H02M 3/01 (2021.05); H02M 3/33573 (2021.05); H02M 3/33584 (2013.01)

(58) Field of Classification Search
CPC ...... H02M 1/0043; H02M 3/01; H02M 3/335; H02M 3/33573; H02M 3/33584
See application file for complete search history.

(56) References Cited

U.S. PATENT DOCUMENTS

| | | | |
|---|---|---|---|
| 2007/0139973 A1* | 6/2007 | Leung | H02M 7/219 |
| | | | 363/16 |
| 2012/0014138 A1* | 1/2012 | Ngo | H02M 3/33584 |
| | | | 363/17 |
| 2016/0344297 A1* | 11/2016 | Lee | H02M 3/33592 |
| 2019/0097544 A1* | 3/2019 | Albertini | H03L 7/0807 |
| 2020/0381945 A1* | 12/2020 | Wang | H02J 50/12 |
| 2021/0066968 A1* | 3/2021 | Danilovic | H02M 7/53873 |
| 2023/0034073 A1* | 2/2023 | Chae | H02J 7/00712 |

* cited by examiner

*Primary Examiner* — Gary L Laxton
(74) *Attorney, Agent, or Firm* — Bridgeway IP Law Group, PLLC; Jihun Kim

(57) ABSTRACT

An apparatus for controlling a bidirectional resonant DC-DC converter includes a bidirectional resonant DC-DC converter that includes a primary-side full-bridge circuit that is coupled to the input side, a secondary-side full-bridge circuit that is coupled to the output side, and a resonant tank that is coupled between the primary-side full-bridge circuit and the secondary-side full-bridge circuit, and a PWM control unit that performs PWM control on the primary-side full-bridge circuit and the secondary-side full-bridge circuit and performs phase shift PWM control and dead-time PWM control.

15 Claims, 8 Drawing Sheets

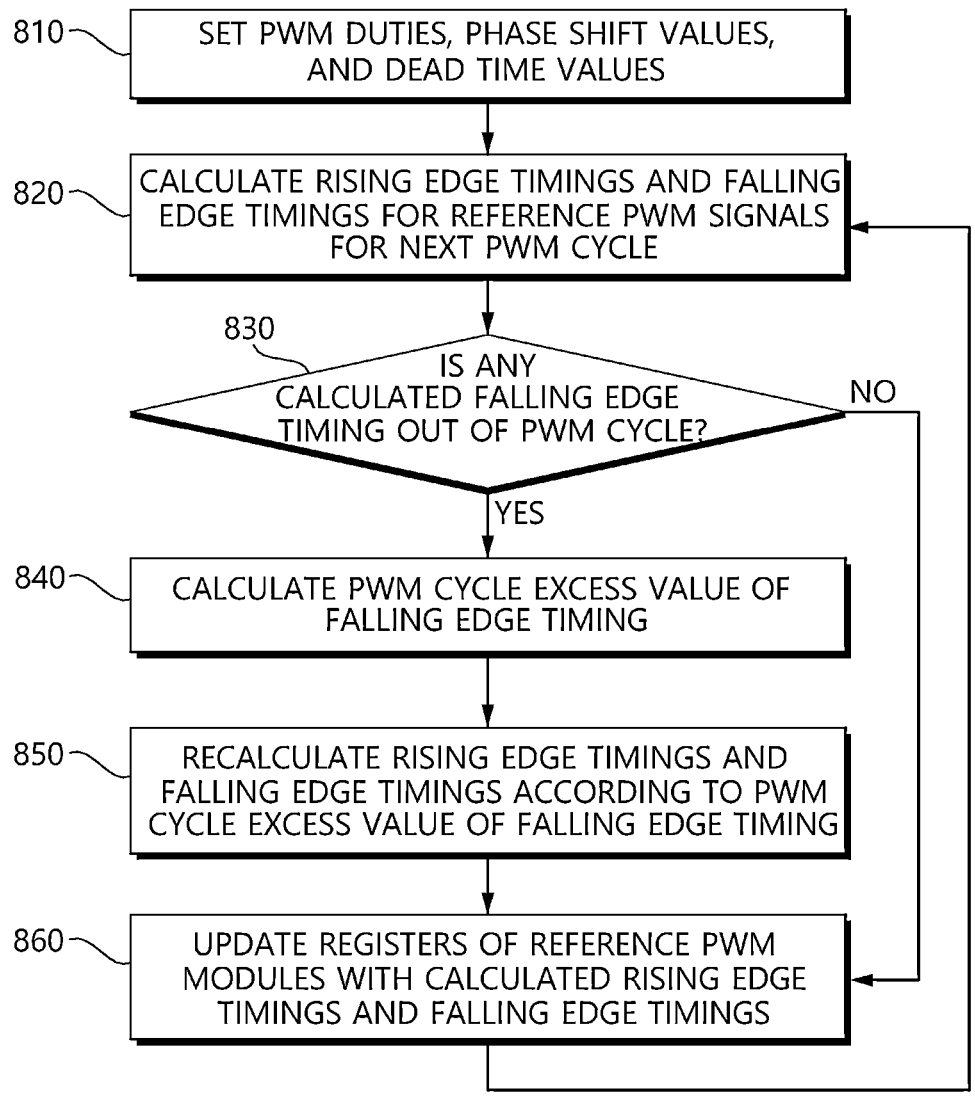

810 — SET PWM DUTIES, PHASE SHIFT VALUES, AND DEAD TIME VALUES

820 — CALCULATE RISING EDGE TIMINGS AND FALLING EDGE TIMINGS FOR REFERENCE PWM SIGNALS FOR NEXT PWM CYCLE

830 — IS ANY CALCULATED FALLING EDGE TIMING OUT OF PWM CYCLE?

NO

YES

840 — CALCULATE PWM CYCLE EXCESS VALUE OF FALLING EDGE TIMING

850 — RECALCULATE RISING EDGE TIMINGS AND FALLING EDGE TIMINGS ACCORDING TO PWM CYCLE EXCESS VALUE OF FALLING EDGE TIMING

860 — UPDATE REGISTERS OF REFERENCE PWM MODULES WITH CALCULATED RISING EDGE TIMINGS AND FALLING EDGE TIMINGS

FIG. 8

APPARATUS AND METHOD FOR CONTROLLING BIDIRECTIONAL RESONANT DC-DC CONVERTERS

CROSS-REFERENCE TO RELATED APPLICATIONS

This application claims priority to and the benefit of Korean Patent Application No. 10-2022-0187163 filed in the Korean Intellectual Property Office on Dec. 28, 2022, the entire contents of which are incorporated herein by reference.

TECHNICAL FIELD

The present invention relates to an apparatus and method for controlling a bidirectional resonant DC-DC converter, and more particularly, to an apparatus and method for performing pulse width modulation (PWM) control on a bidirectional resonant DC-DC converter.

BACKGROUND ART

In order to solve environmental and energy problems, there is a growing interest in eco-friendly vehicles such as hybrid electric vehicles and electric vehicles. Electric vehicles (EVs) and plug-in hybrid electric vehicles (PHEVs) are equipped with high-voltage batteries and on-board chargers (OBCs) to charge the high-voltage battery.

The OBCs serve to charge the high-voltage batteries which are main batteries, and generally include power factor correction PFC converters and LLC converters. The LLC converters have resonant circuits (resonant tanks) consisting of resonant inductance Lr, magnetizing inductance Lm, and resonant capacitance Cr.

FIG. 1 is an example of the circuit diagram of an OBC. Referring to FIG. 1, an OBC may include a PFC converter 20 that performs conversion from AC power received from an external AC power source into DC power to be output, and a DC-DC converter 30 that performs power conversion on the DC power received from the PFC converter 20 and transmits it to a high-voltage battery. Here, the DC-DC converter 30 may be a bidirectional resonant DC-DC converter 30 that consists of a primary-side full-bridge circuit 40 that is coupled to the input side, a secondary-side full-bridge circuit 60 that is coupled to the output side, and a CLLC resonant tank 50 that is coupled between the primary-side full-bridge circuit 40 and the secondary-side full-bridge circuit 60 so as to be capable of bidirectional charging and discharging.

The primary-side full-bridge circuit 40 consists of four switches $Q_7$, $Q_8$, $Q_9$, and $Q_{10}$, and the secondary-side full-bridge circuit 60 consists of four switches $Q_{7\_r}$, $Q_{8\_r}$, $Q_{9\_r}$, and $Q_{10\_r}$. Basically, the switches $Q_7$ and $Q_9$, the switches $Q_8$ and $Q_{10}$, the switches $Q_{7\_r}$ and $Q_{9\_r}$, and the switches $Q_{8\_r}$ and $Q_{10\_r}$ coupled in series with each other function complementarily to each other.

When the switches $Q_7$ and $Q_{10}$ of the primary-side full-bridge circuit 40 and the switches $Q_{7\_r}$ and $Q_{10\_r}$ of the secondary-side full-bridge circuit 60 are turned on, energy is transferred from the primary side to the secondary side such that the battery is charged (a charging mode), and when the switches $Q_8$ and $Q_9$ of the primary-side full-bridge circuit 40 and the switches $Q_{8\_r}$ and $Q_{9\_r}$ of the secondary-side full-bridge circuit 60 are turned on, energy is transferred from the secondary side to the primary side such that the battery is discharged (a discharging mode). In the bidirectional resonant DC-DC converter 30 that functions at high frequencies, switching loss occurring in the switches is one of the biggest factors in efficiency degradation.

As techniques for reducing switching loss in PWM control, there are a phase shift PWM control technique and a dead-time PWM control technique.

However, applying the phase shift PWM control technique and the dead-time PWM control technique together to a bidirectional resonant DC-DC converter has not yet been implemented due to various technical issues.

The present invention has been made in an effort to provide an apparatus and method for controlling a bidirectional resonant DC-DC converter, capable of applying PWM control.

SUMMARY OF THE INVENTION

An exemplary embodiment of the present invention provides an apparatus for controlling a bidirectional resonant DC-DC converter which includes a bidirectional resonant DC-DC converter that includes a primary-side full-bridge circuit that is coupled to the input side, a secondary-side full-bridge circuit that is coupled to the output side, and a resonant tank that is coupled between the primary-side full-bridge circuit and the secondary-side full-bridge circuit, and a PWM control unit that performs PWM control on the primary-side full-bridge circuit and the secondary-side full-bridge circuit and performs phase shift PWM control and dead-time PWM control, and is characterized in that the PWM control unit includes a reference PWM module that generates a reference PWM signal, a control PWM module that generates a control PWM signal from the reference PWM signal to perform PWM control on the bidirectional resonant DC-DC converter, and an arithmetic module that calculates a rising edge timing and falling edge timing for the reference PWM signal according to a PWM duty, a phase shift value, and dead time values, and when the calculated falling edge timing is out of the PWM cycle, the arithmetic module recalculates a rising edge timing and a falling edge timing such that the falling edge timing falls in the PWM cycle.

The arithmetic module may update registers of the reference PWM module with the rising edge timing and the falling edge timing calculated or recalculated.

The arithmetic module may recalculate a rising edge timing and a falling edge timing by calculating the PWM cycle excess value of the calculated falling edge timing and subtracting the PWM cycle excess value from each of the calculated rising edge timing and falling edge timing.

The dead-time PWM control may include setting of a rising edge dead time and a falling edge dead time.

The reference PWM module may generate two edges for one PWM cycle.

The primary-side full-bridge circuit may consist of a first leg and a second leg coupled in parallel, and on the upper side and lower side of the first leg, a 1-1-th switch and a 1-3-th switch may be provided, respectively, and on the upper side and lower side of the second leg, a 1-2-th switch and a 1-4-th switch may be provided, respectively, and the secondary-side full-bridge circuit may consist of a third leg and a fourth leg coupled in parallel, and on the upper side and lower side of the third leg, a 2-1-th switch and a 2-3-th switch may be provided, respectively, and on the upper side and lower side of the fourth leg, a 2-2-th switch and a 2-4-th switch may be provided, respectively.

Phase shift PWM control may be applied to any one switch of the primary-side circuit. Here, any one switch may be the 1-4-th switch.

Dead-time PWM control may be applied between any one switch of the primary-side full-bridge circuit and any one switch of the secondary-side full-bridge circuit. Here, any one switch of the primary-side full-bridge circuit may be the 1-4-th switch, and any one switch of the secondary-side full-bridge circuit may be the 2-1-th switch.

Another exemplary embodiment of the present invention provides a method for controlling a bidirectional resonant DC-DC converter that is characterized in the bidirectional resonant DC-DC converter includes a primary-side full-bridge circuit that is coupled to the input side, a secondary-side full-bridge circuit that is coupled to the output side, and a resonant tank that is coupled between the primary-side full-bridge circuit and the secondary-side full-bridge circuit, and is controlled by a PWM control unit that performs PWM control on the primary-side full-bridge circuit and the secondary-side full-bridge circuit and performs phase shift PWM control and dead-time PWM control, and the PWM control unit includes a reference PWM module that generates a reference PWM signal, and a control PWM module that generates a control PWM signal from the reference PWM signal to perform PWM control on the bidirectional resonant DC-DC converter, and the method for controlling includes the following: a step of calculating a rising edge timing and falling edge timing for the reference PWM signal according to a PWM duty, a phase shift value, and dead time values, and a step of recalculating a rising edge timing and a falling edge timing such that the falling edge timing falls in the PWM cycle, when the calculated falling edge timing is out of the PWM cycle.

The method for controlling may further include a step of updating registers of the reference PWM module with the rising edge timing and the falling edge timing calculated or recalculated.

The step of recalculating may include a step of calculating the PWM cycle excess value of the calculated falling edge timing, and a step of recalculating a rising edge timing and a falling edge timing by subtracting the PWM cycle excess value from each of the calculated rising edge timing and falling edge timing.

According to exemplary embodiments of the present invention, it is possible to apply the phase shift PWM control technique and the dead-time PWM control technique together to the bidirectional resonant DC-DC converter by recalculating a falling edge timing such that the falling edge timing does not deviate from a PWM cycle, when a falling edge timing calculated to generate a reference PWM signal is out of the PWM cycle. Accordingly, it is possible to contribute to reducing switching loss in the bidirectional resonant DC-DC converter, resulting in an improvement in efficiency.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 8 shows the flow chart of a method for controlling a bidirectional resonant DC-DC converter according to an exemplary embodiment of the present invention.

Figure 1:
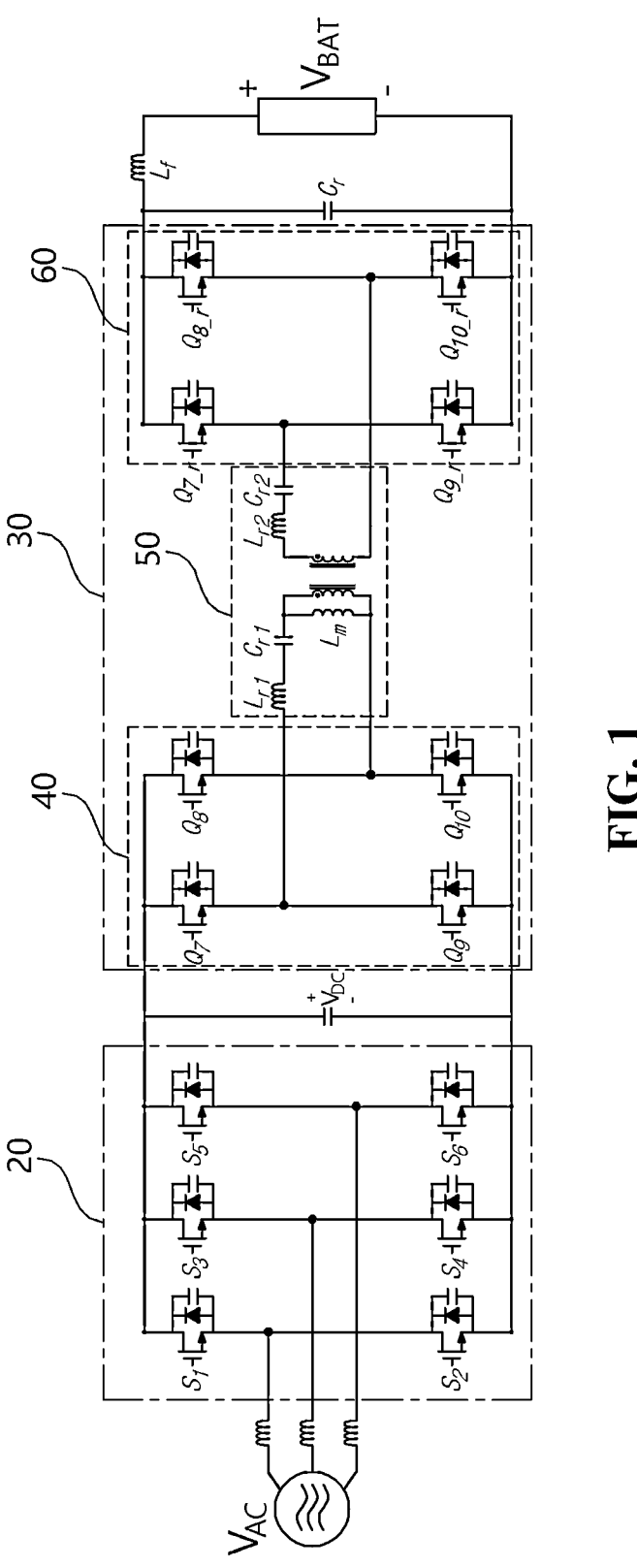
FIG. 1 is an example of the circuit diagram of an OBC.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. Throughout the following description and the accompanying drawings, substantially identical constituent elements are denoted by the same reference symbols, and a redundant description thereof will not be made. Further, when describing the present invention, detailed descriptions of publicly known functions or components will not be made if it is determined that a specific description thereof may obscure the gist of the present invention.

Figure 2:
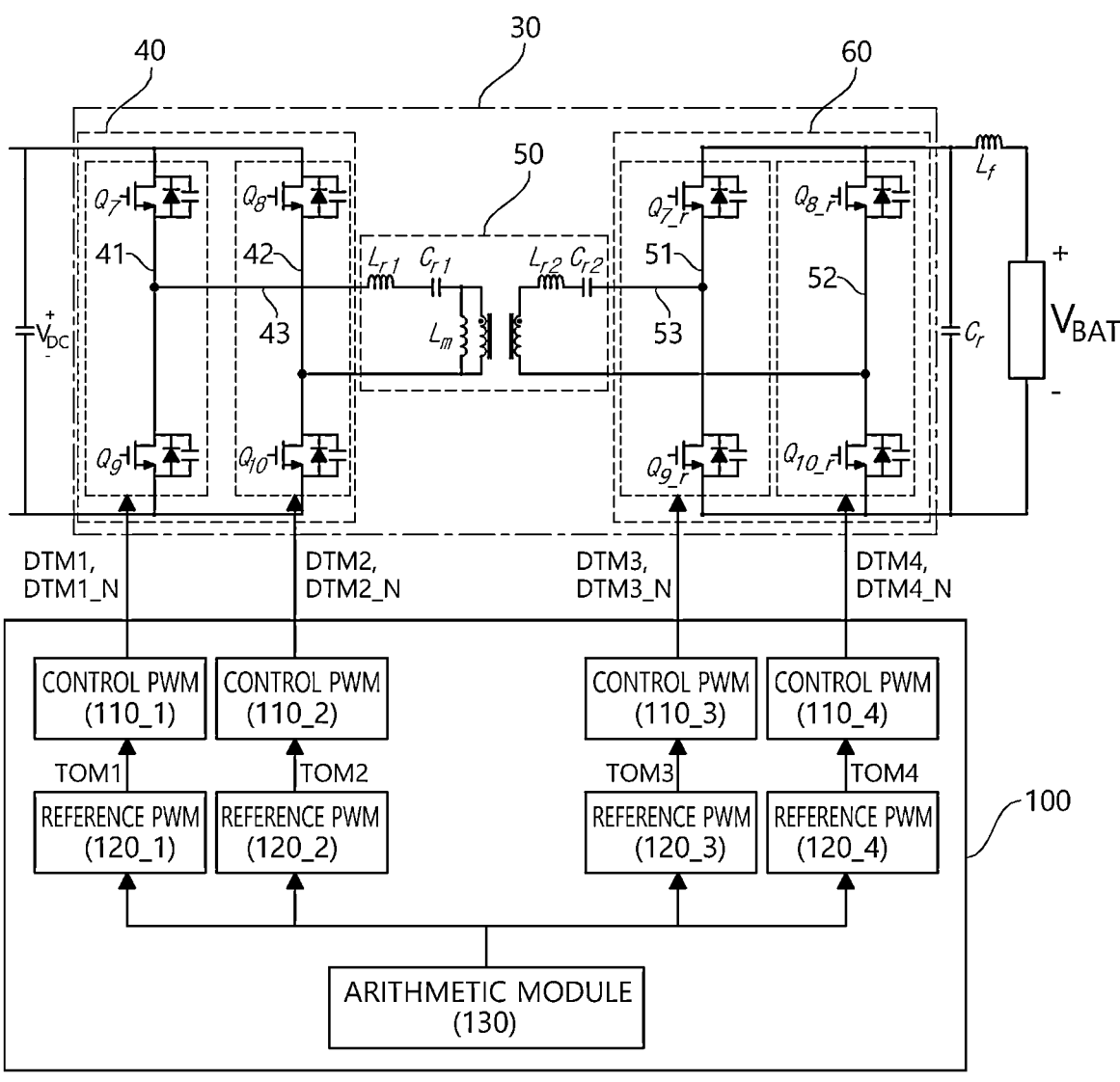
FIG. 2 shows the configuration of an apparatus for controlling a bidirectional resonant DC-DC converter according to an exemplary embodiment of the present invention.

FIG. 2 shows the configuration of an apparatus for controlling a bidirectional resonant DC-DC converter according to an exemplary embodiment of the present invention.

The apparatus for controlling a bidirectional resonant DC-DC converter according to the present exemplary embodiment includes a bidirectional resonant DC-DC converter 30, and a PWM control unit 100 that performs PWM control on the bidirectional resonant DC-DC converter 30.

The bidirectional resonant DC-DC converter 30 includes a primary-side full-bridge circuit 40 that is coupled to the input side, a secondary-side full-bridge circuit 60 that is coupled to the output side, and a CLLC resonant tank 50 that is coupled between the primary-side full-bridge circuit 40 and the secondary-side full-bridge circuit 60.

The primary-side full-bridge circuit 40 may include 1-1-th to 1-4-th switches $Q_7$, $Q_8$, $Q_9$, and $Q_{10}$. More specifically, the primary-side full-bridge circuit 40 may consist of a first leg 41 and a second leg 42 coupled in parallel, and the upper contact point and lower contact point of the first leg 41 and the second leg 42 may be coupled to both ends of an input capacitor, respectively, and on the upper side and lower side of the first leg 41, the 1-1-th switch $Q_7$ and the 1-3-th switch $Q_9$ may be provided, respectively, and on the upper side and lower side of the second leg 42, the 1-2-th switch $Q_8$ and the 1-4-th switch $Q_{10}$ may be provided, respectively. For example, the 1-1-th to 1-4-th switches $Q_7$, $Q_8$, $Q_9$, and $Q_{10}$ may be MOSFET switches.

On an input voltage line 43 that couples the first leg 41 and the second leg 42, specifically, an input voltage line 43 that couples the contact point of the 1-1-th switch $Q_7$ and the 1-3-th switch $Q_9$ and the contact point of the 1-2-th switch $Q_8$ and the 1-4-th switch $Q_{10}$, a leakage inductor $L_{r1}$ and a magnetizing inductor Lm may be provided, and the magnetizing inductor Lm may be coupled in parallel with the primary-side winding of a transformer.

The secondary-side full-bridge circuit 60 may consist of 2-1-th to 2-4-th switches $Q_{7\_r}$, $Q_{8\_r}$, $Q_{9\_r}$, and $Q_{10\_r}$. More specifically, the secondary-side full-bridge circuit 60 may consist of a third leg 51 and a fourth leg 52 coupled in parallel, and the upper contact point and lower contact point of the third leg 51 and the fourth leg 52 may be coupled to both ends of an output capacitor Cr, respectively, and on the upper side and lower side of the third leg 51, the 2-1-th switch $Q_{7\_r}$ and the 2-3-th switch $Q_{9\_r}$ may be provided, respectively, and on the upper side and lower side of the fourth leg 52, the 2-2-th switch $Q_{8\_r}$ and the 2-4-th switch $Q_{10\_r}$ may be provided, respectively. For example, the 2-1-th to 2-4-th switches $Q_{7\_r}$, $Q_{8\_r}$, $Q_{9\_r}$, and $Q_{10\_r}$ may be MOSFET switches.

On an output voltage line 53 that couples the third leg 51 and the fourth leg 52, specifically, an output voltage line 53 that couples the contact point of the 2-1-th switch $Q_{7\_r}$ and the 2-3-th switch $Q_{9\_r}$ and the contact point of the 2-2-th switch $Q_{8\_r}$ and the 2-4-th switch $Q_{10\_r}$, a leakage inductor $L_{r2}$ may be provided, and the leakage inductor $L_{r2}$ may be coupled in series with the secondary-side winding of the transformer.

The PWM control unit 100 may perform PWM control on the primary-side full-bridge circuit 40 and the secondary-side full-bridge circuit 60. At this time, the PWM control unit may perform phase shift PWM control and dead-time PWM control simultaneously.

The phase shift PWM control is one of PWM control techniques for full-bridge circuits widely known to reduce switching loss. For example, when switching from a charging mode (in which the switches $Q_7$ and $Q_{10}$ are on) to a discharging mode (in which the switches $Q_8$ and $Q_9$ are on) is made directly without a phase shift, current may flow while the voltages of the switches are not 0, causing a switching loss. In this case, the phase of a PWM signal for the switches $Q_8$ and $Q_9$ may be shifted so as to make a period in which only the switches $Q_7$ and $Q_8$ or only the switches $Q_9$ and $Q_{10}$ are on during switching between the charging mode and the discharging mode. In this case, current flows in the state where the voltages of the switches are 0, and thus a switching loss does not occur.

Figure 3:
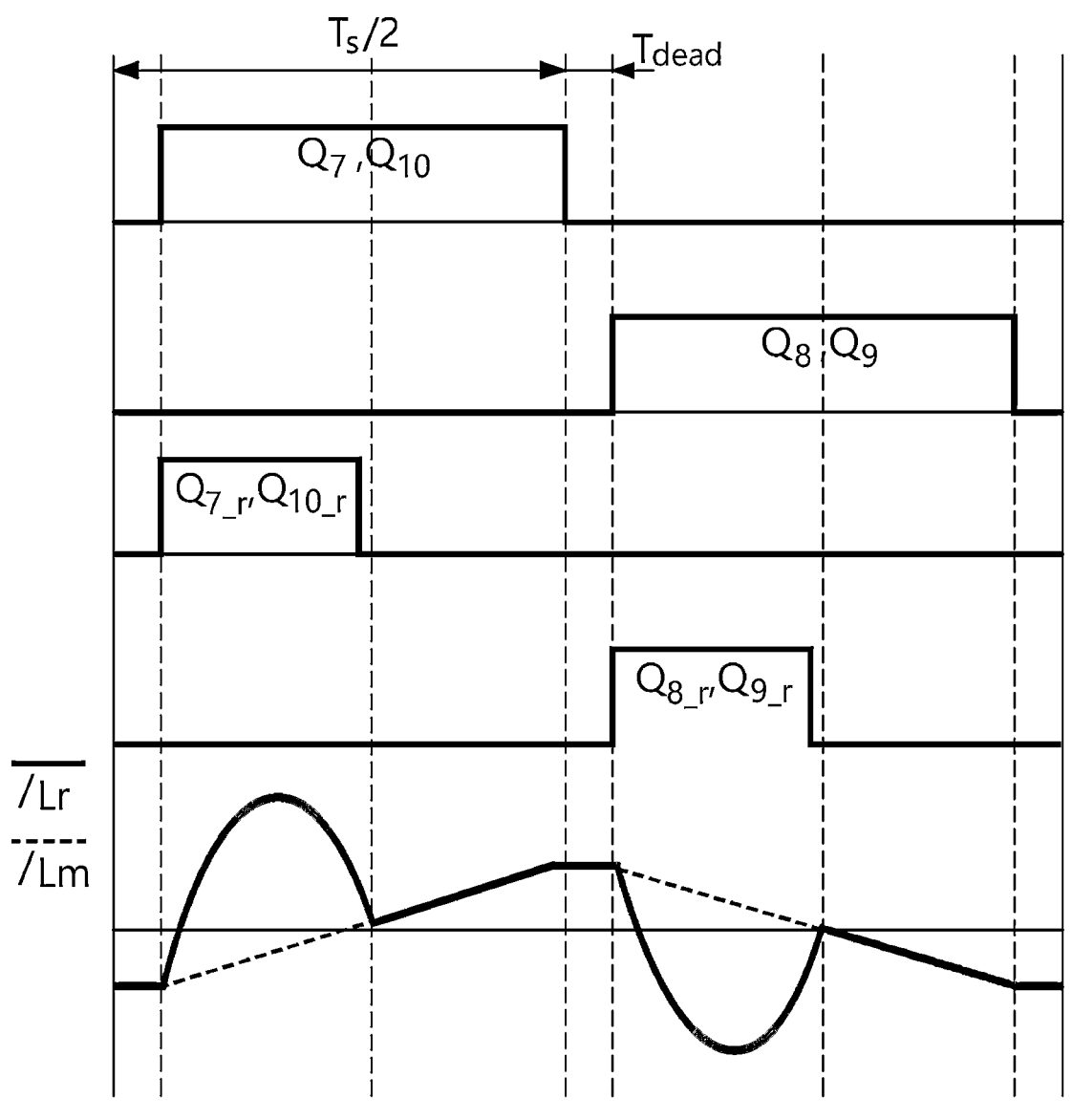
FIG. 3 is a drawing illustrating a dead-time PWM control technique.

FIG. 3 is a drawing illustrating a dead-time PWM control technique.

Referring to FIG. 3, a time delay $T_{dead}$ may be given between a period when the switches $Q_7$ and $Q_{10}$ are on and a period when the switches $Q_8$ and $Q_9$ are on, such that the switches are not on at the same time, and this time delay will be referred to as a primary-side dead time.

Secondary-side dead times refer to dead times that are applied between a primary-side PWM signal and a secondary-side PWM signal. The secondary-side dead times may be classified into rising edge dead times and falling edge dead times, which are required for different reasons.

When the rising edge for the secondary-side switches $Q_{7\_r}$ and $Q_{10\_r}$ occurs prior to the rising edge for the primary-side switches $Q_7$ and $Q_{10}$ (i.e., when the switches $Q_{7\_r}$ and $Q_{10\_r}$ are turned on prior to the switches $Q_7$ and $Q_{10}$), reverse current may occur. To prevent this, a time delay may be given between the rising edge for the primary-side switches $Q_7$ and $Q_{10}$ and the rising edge for the secondary-side switches $Q_{7\_r}$ and $Q_{10\_r}$, and this time delay will be referred to as a rising edge dead time (however, not shown in FIG. 3).

The falling edge dead time may refer to a time delay that is given between a falling edge for the primary-side switches $Q_7$ and $Q_{10}$ and a falling edge for the secondary-side switches $Q_7$ r and $Q_{10\_r}$. For the bidirectional resonant DC-DC converter, the control method varies depending on the resonance frequency that is a unique frequency that varies depending on the output load, and specifically, varies depending on whether the resonance frequency is lower than, equal to, or higher than the switching frequency. When the resonance frequency is higher than the switching frequency, as shown in FIG. 3, the secondary-side switches $Q_{7\_r}$ and $Q_{10\_r}$ may be turned off prior to the primary-side switches $Q_7$ and $Q_{10}$ when current $I_{Lm}$ flowing in the magnetizing inductor Lm becomes 0 (see the fifth graph), such that switching loss is reduced.

In the exemplary embodiment of the present invention, the phase shift PWM control and the dead-time PWM control (particularly, on the secondary-side dead times) are applied together to the bidirectional resonant DC-DC converter 30 to minimize switching loss, thereby achieving high efficiency.

Referring to FIG. 2 again, the PWM control unit 100 includes first to fourth reference PWM modules 120_1, 120_2, 120_3, and 120_4, first to fourth control PWM modules 110_1, 110_2, 110_3, and 110_4, and an arithmetic module 130. In the following description, a reference PWM module 120 may refer to an arbitrary reference PWM module among the first to fourth reference PWM modules 120_1, 120_2, 120_3, and 120_4, and a control PWM module 110 may refer to an arbitrary control PWM module among the first to fourth control PWM modules 110_1, 110_2, 110_3, and 110_4.

In each PWM cycle, the reference PWM modules 120 generate reference PWM signals and output them to the control PWM modules 110, and the control PWM modules 110 generate control PWM signals from the reference PWM signals, thereby controlling the bidirectional resonant DC-DC converter 30. In each PWM cycle, the arithmetic module 130 calculates rising edge timings and falling edge timings of reference PWM signals for the next PWM cycle on the basis of PWM duties, phase shift values, and dead time values that are set in advance. The reference PWM modules 120 have registers SR0 and SR1 for setting rising edge timings and falling edge timings. In each PWM cycle, the arithmetic module 130 may calculate rising edge timings and falling edge timings of reference PWM signals for the next PWM cycle, thereby setting the calculated timings in the registers SR0 and SR1 of the reference PWM modules 120. In this case, in the next PWM cycle, reference PWM signals are generated based on the values set in the registers SR0 and SR1. The control PWM modules 110 generate complementary control PWM signals by applying dead times to reference PWM signals.

The first reference PWM module 120_1 outputs a reference PWM signal TOM1. The first control PWM module 110_1 applies dead times to the reference PWM signal TOM1 to generate complementary control PWM signals DTM1 and DTM1_N, thereby controlling the switches $Q_7$ and $Q_9$.

The second reference PWM module 120_2 outputs a reference PWM signal TOM2. The second control PWM module 1102 applies dead times to the reference PWM signal TOM2 to generate complementary control PWM signals DTM2 and DTM2_N, thereby controlling the switches $Q_{10}$ and $Q_8$.

The third reference PWM module 120_3 outputs a reference PWM signal TOM3. The third control PWM module 110_3 applies dead times to the reference PWM signal TOM3 to generate complementary control PWM signals DTM3 and DTM3_N, thereby controlling the switches $Q_{7\_r}$ and $Q_{9\_r}$.

The fourth reference PWM module 1204 outputs a reference PWM signal TOM4. The fourth control PWM module 110_4 applies dead times to the reference PWM signal TOM4 to generate complementary control PWM signals DTM4 and DTM4_N, thereby controlling the switches $Q_{10\_r}$ and $Q_{8\_r}$.

In the exemplary embodiment of the present invention, in order to reduce switching loss, a phase shift may be applied between the switches $Q_7$ and $Q_{10}$. The phase shift between the switches $Q_7$ and $Q_{10}$ may refer to a time delay between the rising edges for the switches $Q_7$ and $Q_{10}$. Further, primary-side dead times may be applied between complementary switches, and secondary-side dead times may be applied between the switch $Q_{10}$ of the primary-side full-bridge circuit 40 and the switch $Q_{7\_r}$ of the secondary-side full-bridge circuit 60.

Figure 4A:
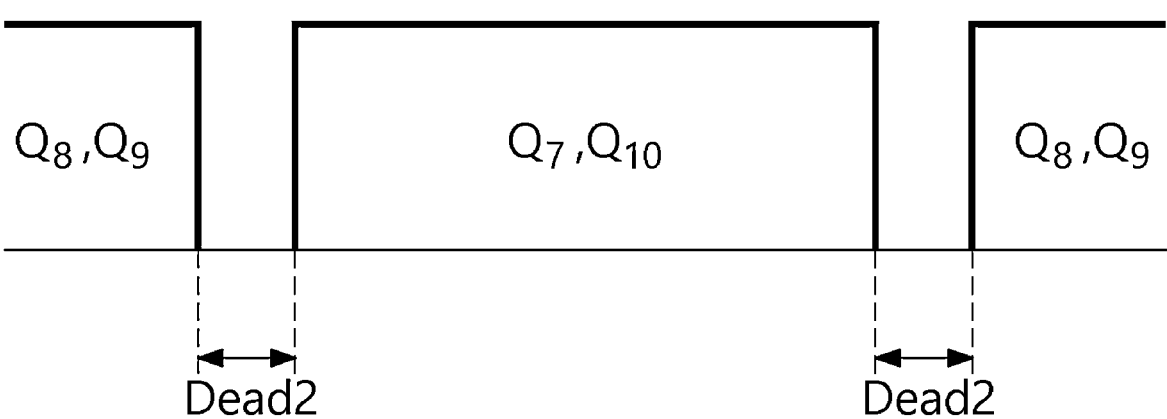
FIGS. 4A and 4B show the definitions of dead times that are applied to individual switches according to the exemplary embodiment of the present invention.
Figure 4B:
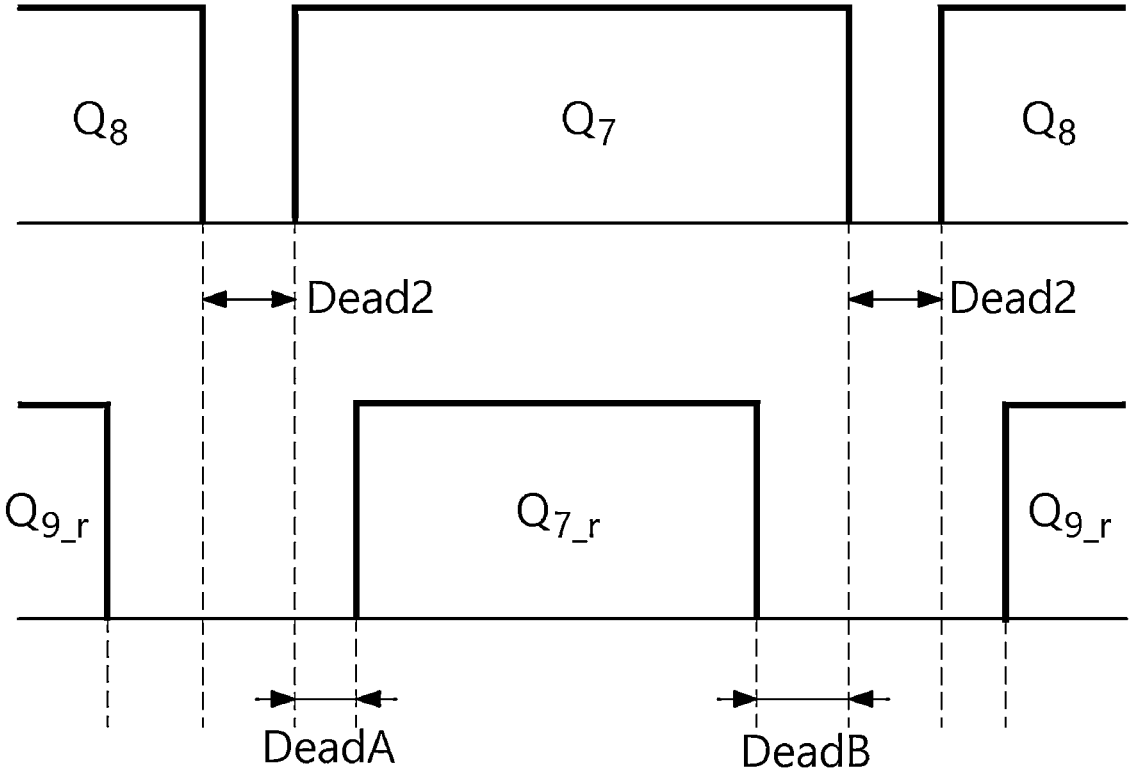

FIGS. 4A and 4B show the definitions of dead times that are applied to individual switches according to the exemplary embodiment of the present invention.

FIG. 4A shows the definitions of primary-side dead times. The time delay between a falling edge for the switches $Q_7$ and $Q_{10}$ and a rising edge for the switches $Q_8$ and $Q_9$ or the time delay between a falling edge for the switches $Q_8$ and $Q_9$ and a rising edge for the switches $Q_7$ and $Q_{10}$ is a primary-side dead time, and will be referred to as Dead2.

FIG. 4B shows the definitions of secondary-side dead times. The time delay between a rising edge for the switch $Q_{10}$ and a rising edge for the switch $Q_{7\_r}$ is a rising edge dead time, and will be referred to as DeadA. The time delay between a falling edge for the switch $Q_{7\_r}$ and a falling edge for the switch $Q_{10}$ is a falling edge dead time, and will be referred to as DeadB. Similarly, secondary-side dead times are also applied between the switches $Q_8$ and $Q_{9\_r}$. Accordingly, if all of the primary-side dead times and the secondary-side dead times are applied, the time delay between a falling edge for the switch $Q_{9\_r}$ and a rising edge for the switch $Q_{7\_r}$ and the time delay between a falling edge for the switch $Q_{7\_r}$ and a rising edge for the switch $Q_9$ r become DeadB+Dead2+DeadA.

Figure 5:
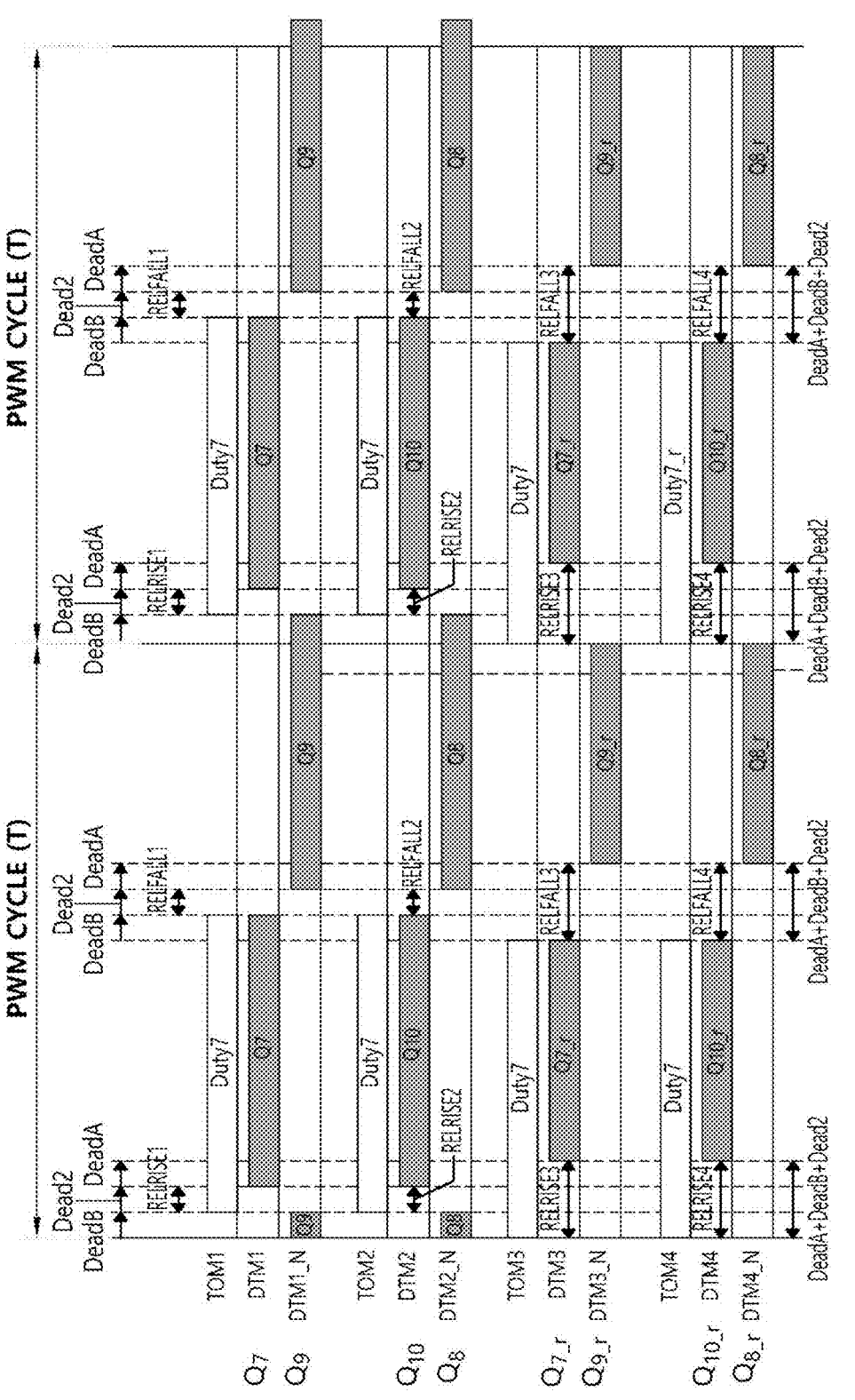
FIG. 5 shows examples of reference PWM signals and control PWM signals when phase shift PWM control is not performed and secondary-side dead-time PWM control is performed.

FIG. 5 shows examples of reference PWM signals and control PWM signals when phase shift PWM control is not performed and secondary-side dead-time PWM control is performed. In FIG. 5, the PWM duties are 50%, and a primary-side dead time Dead2 and secondary-side dead times DeadA and DeadB are applied. The duties of reference PWM signals are set as PWM duties.

In the control PWM modules 110, dead time values for generating corresponding control PWM signals from reference PWM signals are set. Referring to FIG. 5, from the reference PWM signal TOM1 with DeadB, the complementary control PWM signals DTM1 and DTM1_N with Dead2 are generated. Further, from the reference PWM signal TOM2 with DeadB, the complementary control PWM signals DTM2 and DTM2_N with Dead2 are generated. Furthermore, from the reference PWM signal TOM3, the complementary control PWM signals DTM3 and DTM3_N with DeadB+Dead2+DeadA are generated. In addition, from the reference PWM signal TOM4, the complementary control PWM signals DTM4 and DTM4_N with DeadB+Dead2+DeadA are generated.

Referring to FIG. 5, it can be seen that the rising edge dead time DeadA and the falling edge dead time DeadB are applied between the control PWM signal DTM2 for PWM control on the switch $Q_{10}$ and the control PWM signal DTM3 for controlling the switch $Q_{7\_r}$.

On the other hand, the reference PWM modules 120 for generating reference PWM signals may generate only two edges for one PWM cycle, due to the characteristics of microcomputers. By the way, when the phase shift PWM control and secondary-side dead time PWM control are applied together, a situation may arise where the reference PWM signals each need three edges for one PWM cycle.

Figure 6:
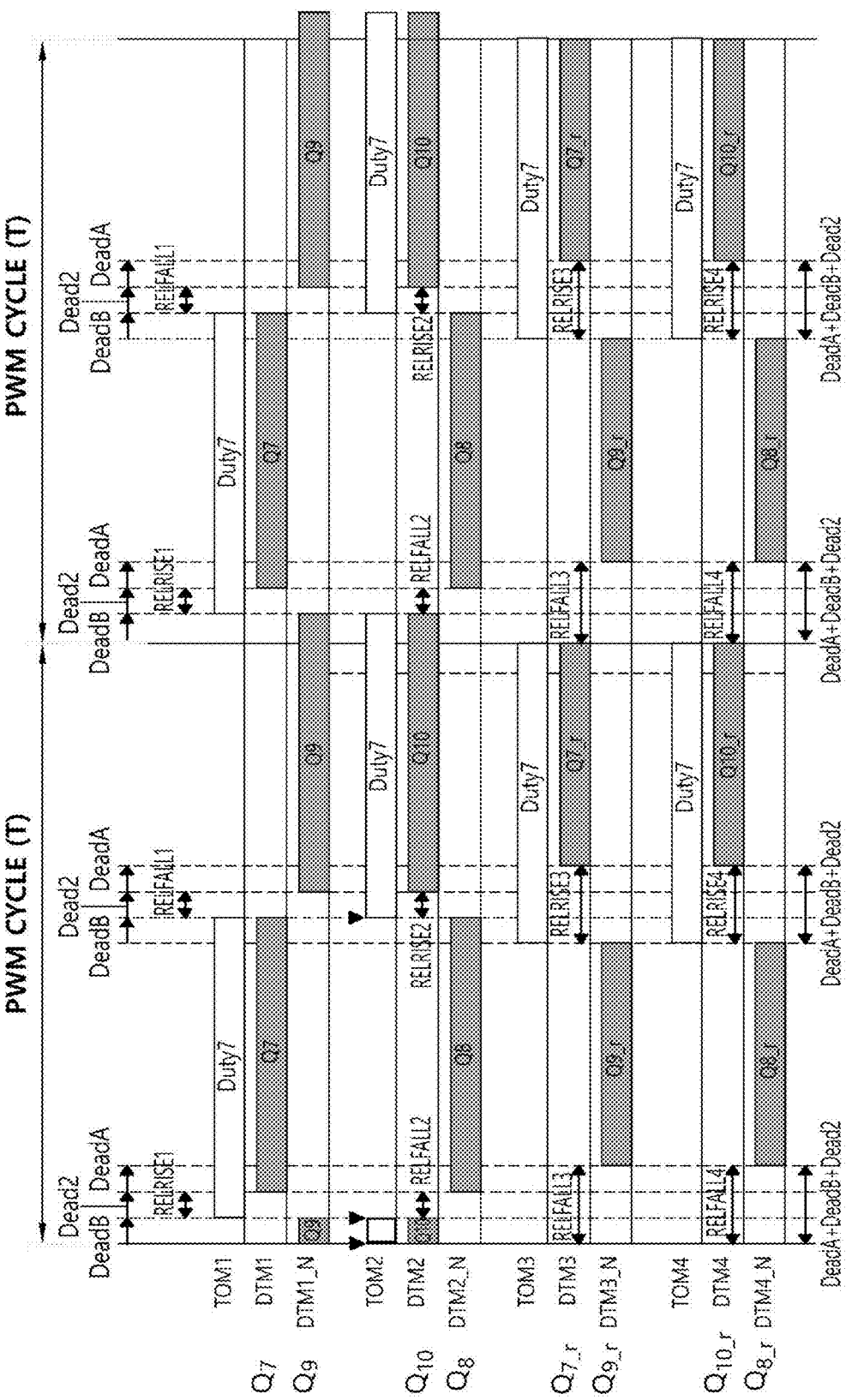
FIG. 6 shows examples of reference PWM signals and control PWM signals that are required when phase shift PWM control and secondary-side dead-time PWM control are performed together.

FIG. 6 shows examples of reference PWM signals and control PWM signals that are required when phase shift PWM control and secondary-side dead-time PWM control are performed together. FIG. 6 shows the case where a phase shift of 50% of a PWM cycle has been applied between the switches $Q_7$ and $Q_{10}$. For this, a phase shift of 50% of one PWM cycle should be given to the reference PWM signal TOM2 to be the basis of the control PWM signal DTM2 for controlling the switch $Q_{10}$. Then, as shown in the drawing, falling edge timings of the reference PWM signal TOM2 may deviate from PWM cycles. Since the default states of the reference PWM modules 120 at the start of a PWM cycle are a low state, in order for the reference PWM modules to become a high state when a PWM cycle starts, occurrence of rising edges is required. Accordingly, in order to generate the reference PWM signal TOM2 as shown in FIG. 6, three edges (marked with '▼'), i.e., a rising edge, a falling edge, and another rising edge should occur for one PWM cycle. However, since it is impossible to generate three edges for one PWM cycle due to the characteristics of a microcomputer implementing the reference PWM modules 120 as described above, the PWM signal as shown in FIG. 6 cannot be generated.

In the exemplary embodiment of the present invention, the arithmetic module 130 calculates the rising edge timings and falling edge timings of reference PWM signals, and check whether the calculated falling edge timings (counter values) are out of the PWM cycle (counter value), before setting them in the registers SR0 and SR1 of the reference PWM modules 120. When the calculated falling edge timings are in the PWM cycle, the arithmetic module 130 sets the calculated rising edge timings and falling edge timings in the registers SR0 and SR1 of the reference PWM modules 120. However, when the calculated falling edge timings are out of the PWM cycle, the arithmetic module 130 recalculates rising edge timings and falling edge timings such that the falling edge timings falls in the PWM cycle, and sets the recalculated rising edge timings and falling edge timings in the registers SR0 and SR1 of the reference PWM modules 120. Specifically, the arithmetic module 130 may calculate the PWM cycle excess value (PS_limit) of a falling edge timing through the following expression.

PS_limit=Falling Edge Timing calculated for Reference PWM Waveform−PWM cycle (Counter Value) Then, the arithmetic module 130 may recalculate rising edge timings and falling edge timings by subtracting the PS_limit values from the calculated rising edge timings and falling edge timings, respectively. The reference PWM signals according to the recalculated rising edge timings and falling edge timings are PWM signals pulled forward by the PS_limit values as compared to the reference PWM signals according to the originally calculated rising edge timings and falling edge timings.

Figure 7:
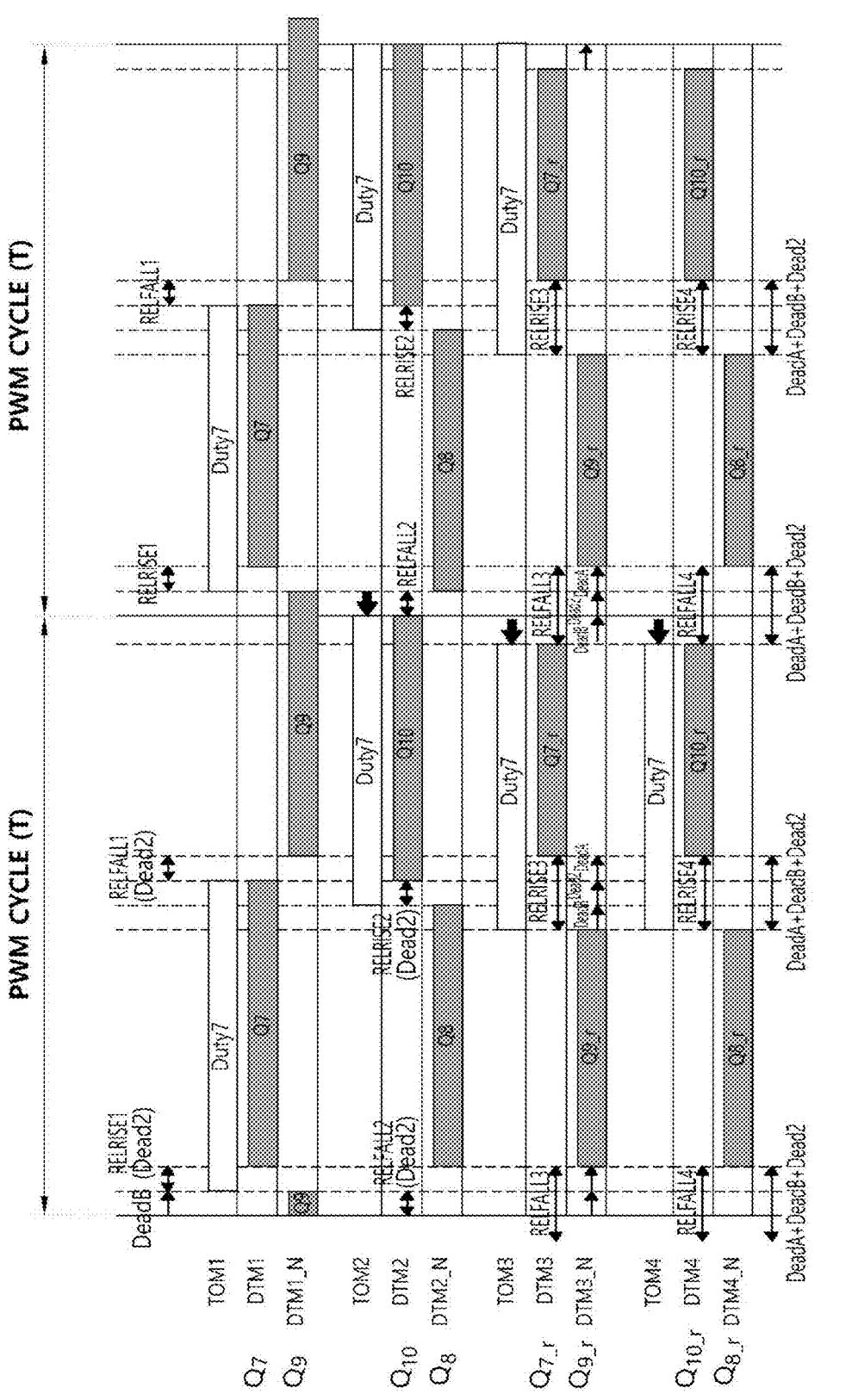
FIG. 7 shows examples of reference PWM signals and control PWM signals when the exemplary embodiment of the present invention is applied to perform phase shift PWM control and secondary-side dead-time PWM control together.

FIG. 7 shows examples of reference PWM signals and control PWM signals according to the exemplary embodiment of the present invention when the phase shift PWM control and the secondary-side dead-time PWM control are performed together.

When a rising edge timings and falling edge timing of the reference PWM signal TOM2 are recalculated by subtracting the PS_limit value from the rising edge timing and falling edge timing of the reference PWM signal TOM2 according to FIG. 6, the reference PWM signal TOM2 is pulled forward by the PS_limit value as shown in FIG. 7 (see an arrow symbol), such that the reference PWM signal TOM2 falls in the PWM cycle. Therefore, the problem in which three edges should be generated for one PWM cycle to generate the reference PWM signal TOM2 is remedied. In this case, as the rising edge timing and falling edge timing of the reference PWM signal TOM2 are recalculated, the rising edge timings and falling edge timings of the reference PWM signals TOM3 and TOM4 are also recalculated by subtracting the PS_limit values. Accordingly, the reference PWM signals TOM3 and TOM4 are also pulled forward by the PS_limit values (see arrow symbols).

FIG. 8 shows the flow chart of a method for controlling the bidirectional resonant DC-DC converter according to an exemplary embodiment of the present invention.

In STEP 810, PWM duties, phase shift values, dead time values Dead2, DeadA, and DeadB, and the like are set in the PWM control unit 100.

In STEP 820, the arithmetic module 130 calculates rising edge timings and falling edge timings for the reference PWM signals TOM1 to TOM4 of the next PWM cycle on the basis of the PWM duties, the phase shift values, and the dead time values.

In STEP 830, the arithmetic module 130 determines whether any calculated falling edge timing is out of the PWM cycle.

When all of the falling edge timings calculated for the reference PWM signals TOM1 to TOM4 fall in the PWM cycle, the arithmetic module 130 proceeds to STEP 860 in which the arithmetic module updates the registers SR0 and SR1 of the reference PWM modules 120_1 to 120_4 with the calculated rising edge timings and falling edge timings.

When it is determined in STEP 830 that a falling edge timing calculated for a reference PWM signal is out of the PWM cycle, the arithmetic module 130 proceeds to STEP 840 in which the arithmetic module calculates the PWM cycle excess value (PS_limit) of the calculated falling edge timing. According to the examples of FIGS. 6 and 7, the PWM cycle excess value (PS_limit) of the falling edge timing calculated for the reference PWM signal TOM2 is calculated.

Then, in STEP 850, the arithmetic module 130 recalculates a rising edge timing and a falling edge timing according to the PWM cycle excess value (PS_limit) of the falling edge timing. Here, a rising edge timing and a falling edge timing may be recalculated by subtracting the PS_limit value from each of the rising edge timing and the falling edge timing calculated in STEP 820. According to the examples of FIGS. 6 and 7, since the reference PWM signals TOM3 and TOM4 are interlocked with the reference PWM signal TOM2, in STEP 850, rising edge timings and falling edge timings for the reference PWM signals TOM2, TOM3, and TOM4 are recalculated.

In STEP 860, the arithmetic module 130 updates the registers SR0 and SR1 of the reference PWM modules 120_1 to 120_4 with the falling edge timings and rising edge timings calculated (or recalculated) in STEP 820 or STEP 850.

If the registers SR0 and SR1 of the reference PWM modules 120_1 to 120_4 are updated, in the next PWM cycle, the reference PWM signals TOM1 to TOM4 are generated according to the rising edge timings and the falling edge timings set in the registers SR0 and SR1, and are input to the control PWM modules 110_1 to 110_4. Then, in the control PWM modules 110_1 to 110_4, the control PWM signals DTM1 to DTM1_N, DTM2 to DTM2_N, DTM3 to DTM3_N, and DTM4 to DTM4_N are generated on the basis of the reference PWM signals TOM1 to TOM4, whereby the switches in the primary-side full-bridge circuit 40 and the secondary-side full-bridge circuit 60 are controlled.

According to the exemplary embodiment of the present invention, during control on the bidirectional resonant DC-DC converter, it is possible to apply the phase shift PWM control and the secondary-side dead-time PWM control simultaneously while generating only two edges for one PWM cycle in each reference PWM module 120. Accordingly, it is possible to reduce switching loss, thereby achieving PWM control on the bidirectional resonant DC-DC converter for high-efficiency OBCs.

Compositions of the individual blocks in the accompanying block diagrams and the individual steps in the flow chart can be executed by computer program instructions. These computer program instructions can be installed in the processors of general-purpose computers, special-purpose computers, or programmable data processing apparatuses. Therefore, the instructions that are executed by a computer or the processor of a programmable data processing apparatus generate means for performing the functions described with respect to the individual blocks in the block diagrams or the individual steps in the flow chart. The computer program instructions can be stored in computer available memories or computer readable memories for computers or programmable data processing apparatuses in order to realize the functions in a specific manner. Therefore, the instructions stored in a computer available memory or a computer readable memory may produce products including the instruction means for performing the functions described with respect to the individual blocks in the block diagrams or the individual steps in the flow chart. The computer program instructions can be loaded onto computers or computer programmable data processing apparatuses. Therefore, a series of operational steps may be executed in a computer or a programmable data processing apparatus to generate a process to be executed by a computer. Accordingly, the instructions which are executed by the computer or the programmable data processing apparatus may provide steps for executing the functions described with respect to the individual blocks in the block diagrams or the individual steps in the flow chart.

And each block or each step may represent a module, a segment, or a portion of code, which includes one or more executable instructions for implementing specified logical function(s). It should also be noted that in some alternative exemplary embodiments, the functions mentioned with respect to the blocks or the steps may occur out of the order. For example, two blocks or steps shown in succession may in fact be executed substantially concurrently or the blocks or the steps may sometimes be executed in the reverse order, depending upon the functionality involved.

Although exemplary embodiments of the present invention have been described for illustrative purposes, those skilled in the art will appreciate that various changes and modifications are possible, without departing from the essential features of the invention as disclosed in the accompanying claims. Therefore, the embodiments of the present invention disclosed above should be considered in a descriptive sense only and not for limiting the technological scope. The technological scope of the present invention is not limited by the embodiments and the accompanying drawings. The spirit and scope of the present invention should be interpreted by the appended claims and it will be appreciated that all technical ideas within the scope equivalent thereto falls within the spirit and scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for controlling a bidirectional resonant DC-DC converter, the apparatus comprising:

a bidirectional resonant DC-DC converter that includes a primary-side full-bridge circuit coupled to an input side, a secondary-side full-bridge circuit coupled to an output side, and a resonant tank coupled between the primary-side full-bridge circuit and the secondary-side full-bridge circuit; and a PWM control unit that is configured to perform a PWM control on the primary-side full-bridge circuit and the secondary-side full-bridge circuit and to perform phase shift PWM control and dead-time PWM control, wherein the PWM control unit comprises:

a reference PWM module configured to generate a reference PWM signal;

a control PWM module configured to generate a control PWM signal from the reference PWM signal to perform the PWM control on the bidirectional resonant DC-DC converter; and an arithmetic module configured to calculate a first rising edge timing and a first falling edge timing for the reference PWM signal according to a PWM duty, a phase shift value, and dead time values, and wherein, when the calculated first falling edge timing is out of a PWM cycle, the arithmetic module calculate a second rising edge timing and a second falling edge timing such that the second falling edge timing falls in the PWM cycle.

2. The apparatus according to claim 1, wherein the arithmetic module is configured to update registers of the reference PWM module with the calculated first rising edge timing and the calculated first falling edge timing or the calculated second rising edge timing and the calculated second falling edge timing.

3. The apparatus according to claim 1, wherein the second rising edge timing and the second falling edge timing are obtained by calculating a PWM cycle excess value of the calculated first falling edge timing and subtracting the PWM cycle excess value from each of the calculated first rising edge timing and the first falling edge timing.

4. The apparatus according to claim 1, wherein the dead-time PWM control includes setting of a rising edge dead time and a falling edge dead time.

5. The apparatus according to claim 1, wherein the reference PWM module is configured to generate two edges for one PWM cycle.

6. The apparatus according to claim 1, wherein the primary-side full-bridge circuit includes a first leg and a second leg coupled in parallel, and on an upper side and a lower side of the first leg, a 1-1-th switch and a 1-3-th switch are provided, respectively, and on an upper side and a lower side of the second leg, a 1-2-th switch and a 1-4-th switch are provided, respectively, and wherein the secondary-side full-bridge circuit includes a third leg and a fourth leg coupled in parallel, and on an upper side and a lower side of the third leg, a 2-1-th switch and a 2-3-th switch are provided, respectively, and on an upper side and a lower side of the fourth leg, a 2-2-th switch and a 2-4-th switch are provided, respectively.

7. The apparatus according to claim 6, wherein phase shift PWM control is applied to at least one switch of the primary-side full-bridge circuit.

8. The apparatus according to claim 7, wherein the at least one switch of the primary-side full-bridge circuit includes the 1-4-th switch.

9. The apparatus according to claim 6, wherein dead-time PWM control is applied between at least one switch of the primary-side full-bridge circuit and at least one switch of the secondary-side full-bridge circuit.

10. The apparatus according to claim 9, wherein the at least one switch of the primary-side full-bridge circuit includes the 1-4-th switch, and the at least one switch of the secondary-side full-bridge circuit includes the 2-1-th switch.

11. A method for controlling a bidirectional resonant DC-DC converter, wherein the bidirectional resonant DC-DC converter includes a primary-side full-bridge circuit coupled to an input side, a secondary-side full-bridge circuit coupled to an output side, and a resonant tank coupled between the primary-side full-bridge circuit and the secondary-side full-bridge circuit, and is controlled by a PWM control unit that is configured to perform a PWM control on the primary-side full-bridge circuit and the secondary-side full-bridge circuit and to perform phase shift PWM control and dead-time PWM control, wherein the PWM control unit includes a reference PWM module configured to generate a reference PWM signal, and a control PWM module configured to generate a control PWM signal from the reference PWM signal to perform the PWM control on the bidirectional resonant DC-DC converter, and wherein the method for controlling comprises:

calculating a first rising edge timing and a first falling edge timing for the reference PWM signal according to a PWM duty, a phase shift value, and dead time values; and calculating a second rising edge timing and a second falling edge timing such that the second falling edge timing falls in a PWM cycle, when the calculated first falling edge timing is out of the PWM cycle.

12. The method according to claim 11, further comprising:

updating registers of the reference PWM module with the calculated first rising edge timing and the first falling edge timing or the calculated second rising edge timing and the second falling edge timing.

13. The method according to claim 11, wherein the calculating the second rising edge timing and the second falling edge timing includes:

calculating a PWM cycle excess value of the calculated first falling edge timing; and obtaining the second rising edge timing and the second falling edge timing by subtracting the PWM cycle excess value from each of the calculated first rising edge timing and the first falling edge timing.

14. The method according to claim 11, wherein the dead-time PWM control includes setting of a rising edge dead time and a falling edge dead time.

15. The method according to claim 11, wherein the reference PWM module is configured to generate two edges for one PWM cycle.

* * * * *